Jan. 21, 1964   A. BARD ETAL   3,118,249
MUSHROOM TRAY
Filed Dec. 23, 1960   2 Sheets-Sheet 1
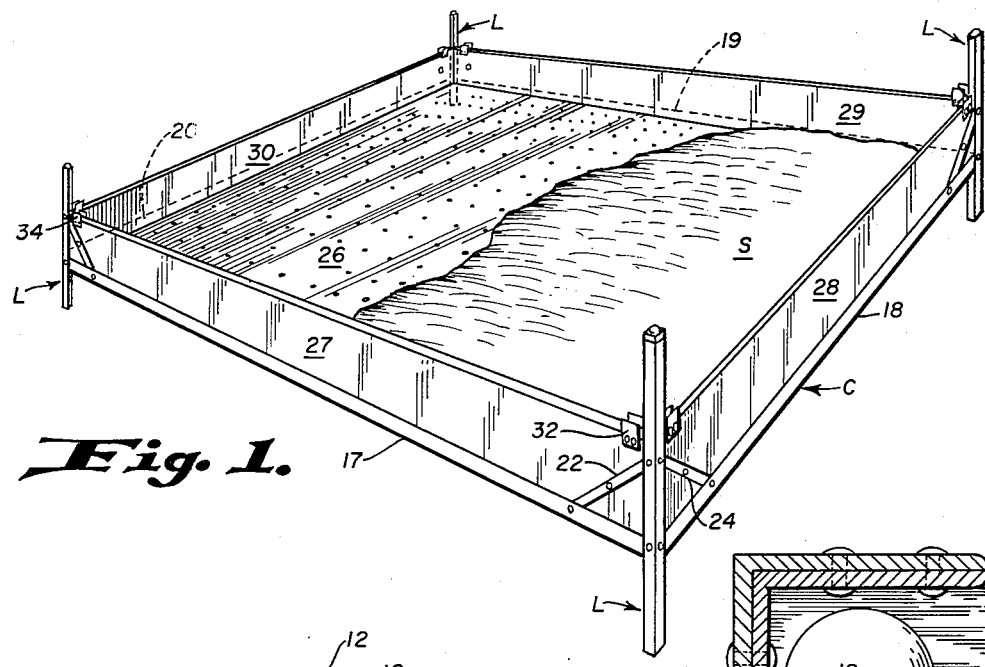
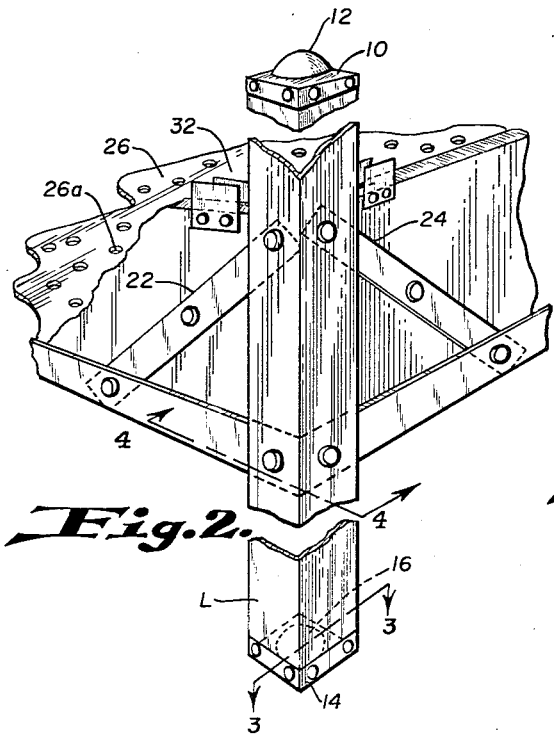
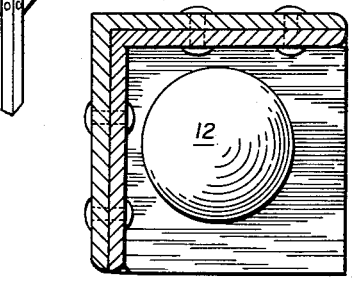
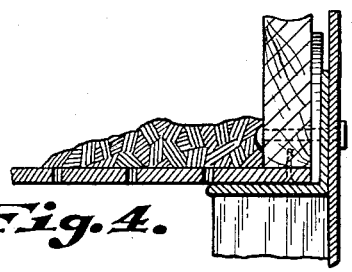
Archie Bard &
Alvin F. Aggen
INVENTORS.
BY Nilsson & Robbins
ATTORNEY Jan. 21, 1964  A. BARD ETAL  3,118,249
MUSHROOM TRAY
Filed Dec. 23, 1960  2 Sheets-Sheet 2

Archie Bard &
Alvin F. Aggen
INVENTORS.

BY Nilsson & Robbins

ATTORNEY

United States Patent Office 3,118,249
Patented Jan. 21, 1964

3,118,249
MUSHROOM TRAY
Archie Bard, 3439 Ocean Drive, Oxnard, Calif., and Alvin F. Aggen, 175 Ramona Place, Camarillo, Calif.
Filed Dec. 23, 1960, Ser. No. 78,025
4 Claims. (Cl. 47—1.1)

The present invention relates to a tray, a plurality of which may be stacked to support substances for exposure to ambient conditions, as is required in the production of mushrooms.

Growing mushrooms involves two distinct steps or sub-processes. In the first step, the root structure or mycelium is formed within a bed of sterilized manure or a similar substance which will support the mushroom growth. During this period the temperature and humidity of the air ambient about the mushroom bed must be exactingly controlled; however, only limited physical access to the mushroom bed is required.

After the root structure has developed in the mushroom bed, the environment of the bed is changed, resulting in mushroom sprouts which grow and may be repeatedly harvested for the productive period of the mushroom bed. Normally, the production period is initiated by covering the mushroom bed with a layer of damp soil and thereafter, mushrooms are produced for a period of several weeks. During this period, the environmental conditions as temperature and humidity are not so critical; however, the mushroom bed must be accessible to enable harvesting the mushrooms.

In view of the distinctly different environmental conditions required for the development of the mycelium and for the growth of the mushrooms, it has been previously proposed to form mushroom beds in containers which may be first placed in an environment satisfactory for the development of the mycelium, and thereafter moved to another environment satisfactory for growing the mushrooms.

As indicated above, the environment for growing the mycelium must be very carefully controlled. Therefore, the cost of providing this environment varies somewhat in proportion to the volume of the space in which it is provided. The mushroom beds need not be accessible during this period; therefore, they may be placed in closer proximity than during the mushroom-growing period. As a result of these considerations, the present invention recognizes the need for a mushroom-growing tray, a plurality of which may be stacked in closely-spaced relationship during the growth of the mycelium and which may be stacked well-spaced apart during the growth of the mushrooms to facilitate harvesting the mushrooms and caring for the mushroom bed.

In the production of mushrooms generally, and particularly during the period when the mycelium is formed, it is important that the temperature and moisture of the mushroom beds be carefully regulated. This regulation is normally effected by circulating air about the mushroom beds. Therefore, a need exists for a tray to carry mushroom beds which tray exposes the beds and yet is sufficiently rigid and sturdy to withstand repeated movement and handling. Of course, it is also important that the tray be of economical construction.

In general, the present invention provides a mushroom-growing tray including a plurality of upright corner posts, e.g. four posts, which are held spaced-apart by support rods extending perpendicularly from the posts and connected thereto at locations removed from the ends of the posts to form H-frame side configurations. A perforated sheet forming the tray bottom lies between the support rods and is framed by side walls. The tray also has mating devices affixed thereto which facilitate the stacking of the trays in different modes so as to provide different space relationships between the mushroom beds depending upon the stage of the mushroom development.

An object of the present invention is to provide an improved mushroom-growing tray which may be economically manufactured, and which is sufficiently rigid to withstand repeated movement.

Another object of the present invention is to provide a mushroom-growing tray, groups of which may be variously stacked to provide different space relationship between the mushroom-growing beds carried on such trays.

Still another object of the present invention is to provide a mushroom-growing tray, a plurality of which may be stacked in close proximity and yet provide considerable exposure of the mushroom beds to the ambient environment.

These and other objects will become apparent from a consideration of the following, taken in conjunction with the figures, wherein:

FIGURE 1 is a perspective view of a mushroom-growing tray constructed in accordance with the present invention;

FIGURE 2 is an enlarged segmented view of a portion of FIGURE 1;

FIGURE 3 is a horizontal sectional view along line 3—3 of FIGURE 2;

FIGURE 4 is a vertical sectional view along line 4—4 of FIGURE 2;

Referring initially to FIGURE 1, there is shown a container C for supporting a bed of substances S, in which mushrooms are grown. The container C is carried by posts or legs L to provide a composite tray which may be differently stacked to support beds of the substance S so as to provide different spacing between the beds.

The composite tray as shown in FIGURE 1 has four legs L positioned at the corners of the container C. The legs may be made of angle iron which may take the form of corrosive-resistant galvanized steel. Of course, the legs L may be made of other materials and in a different form from that disclosed herein, it being clearly understood that the scope of the present invention is not to be related to the illustrative embodiment but rather is to be limited only by the claims hereof.

Figure 7:
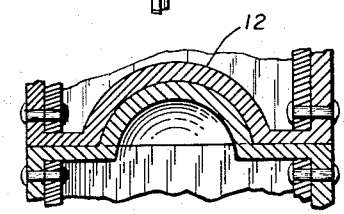
FIGURE 7 is a vertical sectional view along line 7—7 of FIGURE 6.

The legs L have caps affixed upon their ends to facilitate stacking the trays with the beds in spaced-apart relationship. Specifically, the top ends of the legs L carry horizontal caps 10 having a convex central section 12 (FIGURE 2) while the bottom ends of the legs L carry horizontal caps 14 having central concave sections 16 to mate with the convex sections 12 (FIGURE 7).

The legs L are connected to side rails 17, 18, 19 and 20 (FIGURE 1) which extend perpendicularly between the legs and are affixed to the legs at a location removed from the ends thereof to form vertical side frames in an H configuration. In the disclosed embodiment of the present invention the side rails are formed of galvanized-steel angle iron; however, as previously indicated other materials may be employed for any of the component parts of the tray.

The connection between the rails and the legs L is strengthened by corner gussets, e.g. gussets 22 and 24 (FIGURE 2). The connection of the side rails 17, 18, 19 and 20 to the legs L forms a horizontal rectangular frame which includes a support surface of angular cross-section. A sheet 26 of apertured or perforated material is seated within this rectangular frame formed by the rails 17, 18, 19 and 20 to serve as the tray bottom. The sheet 26 may take the form of bonded organic fibre material as material sold under the trade name "Masonite" which is light and flexible and is pierced by perforations 26a. The sheet 26 is held in position by side walls 27, 28, 29 and 30 which are carried above the sheet 26 upon the side rails 17, 18, 19 and 20 respectively so that the side walls are supported in the angular openings of the rails. The side walls are held in position by being affixed to the gussets, as gussets 22 and 24 (FIGURE 2) and may be formed of California redwood as an exemplary material.

The side walls 27 and 29 have brackets 32 and 34 (FIGURE 1) respectively affixed on their upper edges adjacent the side wall 28 to define a somewhat rectangular closure for lateral support. These brackets serve to receive the legs of a similar tray stacked upon the tray of FIGURE 1 and thereby facilitate the alternate mode of stacking the trays with the mushroom beds in close proximity.

In the manufacture of the trays as shown in FIGURE 1, the legs L may be cut to length from angular stock and the caps 10 and 14 affixed thereto by rivets (FIGURE 3). It is to be noted that the caps 10 and 14 may be variously formed as by stamping. Next, the sheet 26 may be affixed to the side walls 27, 28, 29 and 30 which are placed in a rectangular configuration. The rails 17, 18, 19 and 20 along with the side walls 27, 28, 29 and 30 are then affixed between the legs as by rivets and the gussets (as gussets 22 and 24) are mounted between the legs and the rails (FIGURE 4). The brackets 32 and 34 may be placed upon the side walls 27 and 29 either before or after these members are assembled into the tray.

Figure 5:
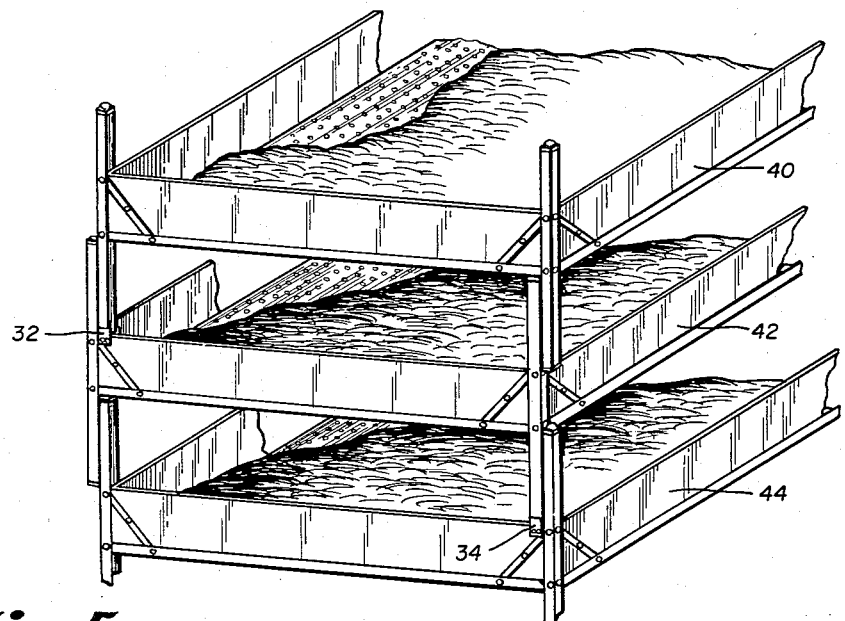
FIGURE 5 is a perspective view of a plurality of trays as shown in FIGURE 1, stacked in one manner.

In using a plurality of the trays as described herein to produce mushrooms, the substance S, normally in the form of sterilized manure, is placed in the trays as shown in FIGURE 1 to a depth of some 4 or 5 inches. The trays are then stacked as shown in FIGURE 5, so that the legs of an upper tray 40 are to the right of the tray 42 immediately below the tray 40. The next lower tray 44 has its legs to the right of the tray 42 so that the legs of alternate trays are received in the brackets 32 and 34 of the next lower tray. Of course, the side of the tray remote from the brackets 32 and 34 is supported by contact between the upper ends of the tray legs L below the rails of the tray.

It is to be noted, that with the trays stacked in this manner, a relatively small space exists between the beds of substance S; however, the space is sufficient to expose the substance to the ambient environmental conditions both through the upper exposed-surface and the lower surface which is partially exposed through the small closely-spaced (relative to the substance) perforations 26a in the sheet 26. With the trays stacked in this configuration in a mushroom-growing house wherein temperature may be closely-controlled the substance S is inoculated with mushroom spawn. It is to be noted, that the space between the trays is adequate to inoculate the beds of substance S, which may be done satisfactorily by simply scattering a suitable amount of spawn upon the surface of the beds by hand.

After inoculation, the beds support the formation of the mushroom root structure, or mycelium. When the mycelium has completely formed, the trays are removed from their location in the mushroom-growing house and carefully inspected for parasitic growth or disease. Of course, the movement of the trays is normally accomplished by machine, therefore, the rigid structure presents a distinct advantage.

After inspection and approval of the beds in the trays, they are covered with a thin layer of soil and stacked in another mushroom-growing house for harvesting. Of course, during harvesting the surfaces of the beds must be accessible; therefore, it is desirable to stack the trays in a configuration providing greater space between the beds of substance S. Coincidentally, during this period, the environment for growing the mushrooms need not be so precisely-controlled as during the growth period for the mycelium. Therefore, the rearrangement of the trays to occupy a greater space is not only advantageous to provide better access, but is also economical in the provision of the different environmental conditions.

Figure 6:
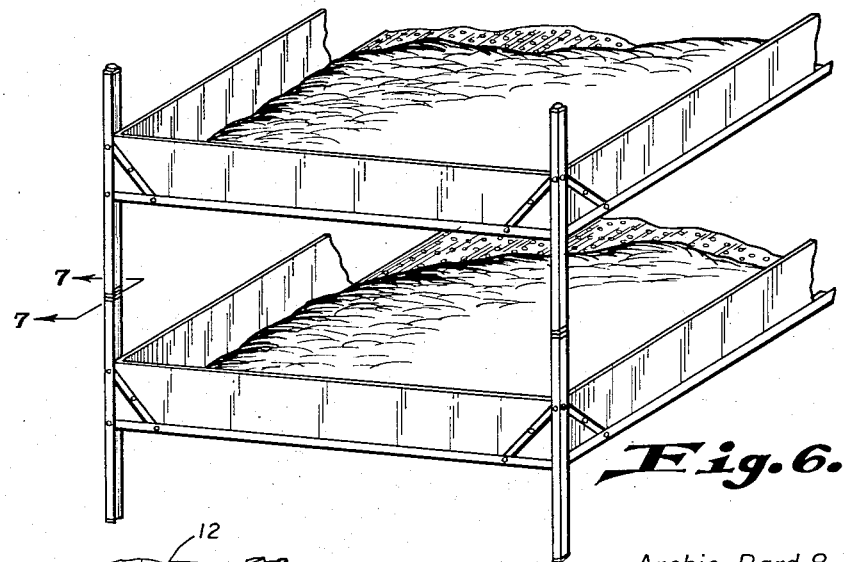
FIGURE 6 is a perspective view of a plurality of trays as shown in FIGURE 1, stacked in another manner.

The manner in which the trays are stacked during the period of mushroom growth is shown in FIGURE 6 wherein the ends of adjacent legs L abut with one another. In this configuration, the convex sections 12 mate with the concave sections 14 (FIGURE 7) so as to provide rigidity to a stack of the trays and substantial space between the trays to permit convenient harvesting of the mushrooms. It is to be noted that when the trays are in the stacked configuration of FIGURE 6, other trays may be supported between the trays shown by having the alternate or interleaved trays angularly offset from the stack of trays shown. In such a configuration, the trays occupy less space than shown in FIGURE 5. Therefore, this stacking configuration may be employed to store the trays, or support substances in close proximity.

After the mushroom bed is depleted, the trays are removed from the mushroom-growing house, emptied of the substance S and cleaned preparatory to another growth cycle. Thus it is important to note that the trays undergo considerable handling so that their rigid structure resulting partly from the H-frame configuration is an important feature of the invention.

Another important feature of the present invention resides in the structure of a tray which may be alternately stacked in different arrangements to provide different spacings between the contents of the tray.

Although various features and concepts of the present invention have been set forth in the foregoing illustrative embodiment, the present invention is not to be limited in accordance therewith but is to be constructed in accordance with the claims set forth below.

What is claimed is:

1. A tray for use in multiplicity to expose substances to select ambient environmental conditions, as in the growth of mushrooms, comprising: a plurality of upright posts including four corner posts positioned to define the corners of a rectangle, said posts having an upper end substantially vertically above a lower end; a plurality of four elongate side rails having upper and lower edges, and extending perpendicularly between said corner posts and being affixed thereto to hold said posts upright, said side rails being affixed to said corner posts whereby the upper edges of said side rails are substantially the same distance from the upper ends of said corner posts, as the lower edges of said side rails are from the lower ends of said corner posts, an apertured bottom supported by said rails whereby to carry said substances for exposure; and mating means affixed to said corner posts and said side rails whereby a multiplicity of said trays may be alternately stacked in a first manner with the upper ends of the posts of a first tray abutting the lower ends of the posts of a second tray, and in a second manner with the upper ends of the posts of a first tray abutting the lower edges of the side rails of a second tray.

2. A tray for use in multiplicity to expose substances to select ambient environmental conditions, as in the growth of mushrooms, comprising: a plurality of upright posts including four corner posts positioned to define the corners of a rectangle, said posts having an upper end substantially vertically above a lower end; a plurality of four elongate side rails having upper and lower edges, and extending perpendicularly between said corner posts and being affixed thereto to hold said posts upright, said side rails being affixed to said corner posts whereby the upper edges of said side rails are substantially the same distance from the upper ends of said corner posts, as the lower edges of said side rails are from the lower ends of said corner posts; and an apertured bottom of bonded organic fiber material supported in said rails for exposure, said bottom containing a multiplicity of closely-spaced, small perforations whereby to support said substance while exposing the same to ambient environment through said apertures.

3. A tray for use in multiplicity to expose substances to select ambient environmental conditions, as in the growth of mushrooms, comprising: a plurality of four upright metal posts having a right-angle cross-section and positioned to define the corners of a rectangle, said posts having an upper end substantially vertically above a lower end; a plurality of four elongate side rails having upper and lower edges, and extending perpendicularly between said corner posts and being affixed thereto to hold said posts upright, said side rails being affixed to said corner posts whereby the upper edges of said side rails are substantially the same distance from the upper ends of said corner posts, as the lower edges of said side rails are from the lower ends of said corner posts; an apertured bottom supported by said rails whereby to carry said substances for exposure; and mating means affixed to said corner posts and said side rails whereby a multiplicity of said trays may be alternately stacked in a first manner with the upper ends of the posts of a first tray abutting the lower ends of the posts of a second tray, and in a second manner with the upper ends of the posts of a first tray abutting the lower edges of the side rails of a second tray.

4. Apparatus according to claim 3 wherein said side rails each comprise: an elongate metal support of right-angle cross-section and an elongate flat section of wood.

References Cited in the file of this patent

UNITED STATES PATENTS

| | | |
|---|---|---|
| 1,147,975 | Ruff | July 27, 1915 |
| 1,209,938 | Collins | Dec. 26, 1916 |
| 1,210,675 | Mundale | Jan. 2, 1917 |
| 1,336,973 | Levene | Apr. 13, 1920 |
| 1,355,486 | Longenecker | Oct. 12, 1920 |
| 1,876,571 | Acuff | Sept. 13, 1932 |
| 2,801,752 | Jakubowski | Aug. 6, 1957 |

FOREIGN PATENTS

| | | |
|---|---|---|
| 8,589 | Australia | of 1932 |
| 220,141 | Switzerland | June 16, 1942 |